United States Patent [19]

Katz et al.

[11] Patent Number: 4,782,581
[45] Date of Patent: Nov. 8, 1988

[54] FERRITE CORE PLACEMENT METHOD

[75] Inventors: Marat G. Katz, Golden Valley; Gino E. Gori, Eden Prairie, both of Minn.

[73] Assignee: Magnetic Peripherals Inc., Minneapolis, Minn.

[21] Appl. No.: 154,819

[22] Filed: Feb. 11, 1988

[51] Int. Cl.[4] ............................................. G11B 5/42
[52] U.S. Cl. ......................................... 29/603; 29/281.5; 29/467; 29/744; 29/759; 29/DIG. 105
[58] Field of Search ................. 29/603, 744, 759, 760, 29/281.5, DIG. 105, 467

[56] References Cited

U.S. PATENT DOCUMENTS

| | | | |
|---|---|---|---|
| 3,653,122 | 4/1972 | Powell, Jr. | 29/744 X |
| 4,509,251 | 4/1985 | Gyi et al. | 29/603 |
| 4,625,393 | 12/1986 | Fuchs | 29/603 |

*Primary Examiner*—Carl E. Hall
*Attorney, Agent, or Firm*—Joseph A. Genovese; Edward P. Heller

[57] ABSTRACT

A method and apparatus for placing a ferrite core in the slot of a pad of a ferrite head. A circular magnet is mounted below a non magnetic table on a slider slidable along a line. The pad is clamped on the table with its slot exposed and aligned along the line and the center of the magnet. When the ferrite core is placed on the table near the magnet, it stands on edge, aligned along a radial line of flux from the magnet. As the magnet is slid towards the slot, the core follows the center of the magnet, aligned along the centerline of the slot following the radial line of flux. The core slides into the slot and is thereafter bonded to the pad.

2 Claims, 4 Drawing Sheets

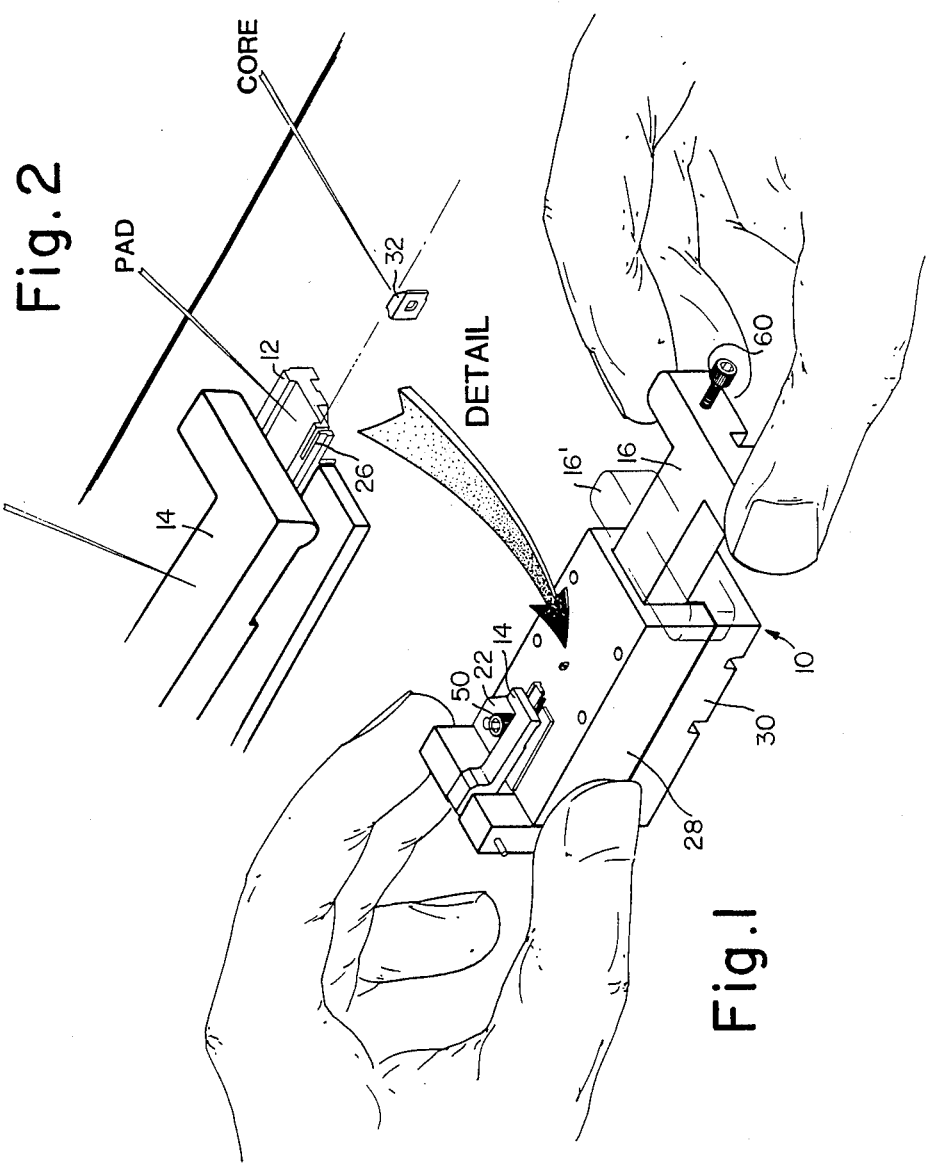

FERRITE CORE PLACEMENT METHOD

FIELD OF THE INVENTION

The invention relates to manipulating small workpieces and more particularly to placing ferrite cores into the pads of ferrite heads.

BRIEF DESCRIPTION OF THE PRIOR ART

The prior method of placing ferrite cores into the slot of the pad of a ferrite head has been to grasp the ferrite core with a pair of tweezers and, with the aid of a microscope or magnifying glass, manually orient the core and place it into the slot. Ferrite heads are primarily utilized in magnetic recording, especially disk drives.

SUMMARY OF THE INVENTION

It is an object of this invention to provide a method and apparatus for placing magnetic cores into the pads of magnetic heads by sliding the core into the slot using a moving magnet.

This object is achieved by providing a circular magnet below a non magnetic table with its center slidable along a line of motion, placing a pad having a slot with a centerline onto a table with its slot exposed and centerline aligned with the line of motion and the center of the magnet, placing a ferrite core on the table near the magnet, whereupon the core stands up on edge under the influence of the magnet's magnetic field, and sliding the magnet towards the pad, moving the now vertically aligned core into the slot. The invention encompasses the placement of a magnetic workpiece into the slot of another workpiece.

BRIEF DESCRIPTION OF THE DRAWINGS

FIG. 1 is a perspective view of a apparatus according to the present invention.

FIG. 2 is a detail of the ferrite core and pad from FIG. 1.

DESCRIPTION OF THE PREFERRED EMBODIMENT

Figure 3:
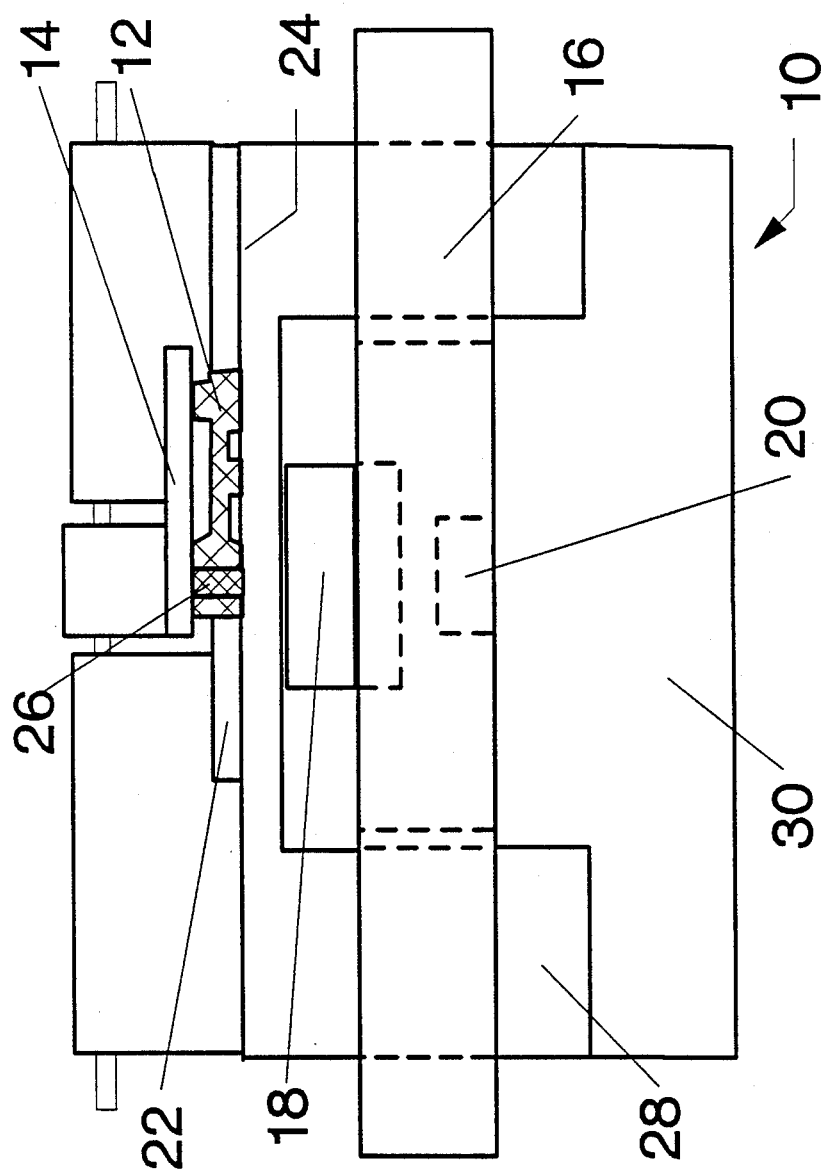
FIG. 3 is a front plan view of the apparatus.

FIGS. 1-5 show the preferred apparatus and method of positioning a magnetic core into a slot of a pad. The apparatus 10 comprises a magnet 18 located on a slider 16. (FIGS. 3-5) Slider 16 is located between upper 28 and lower 30 members of apparatus 10, and preferably has a retainer (not shown) for preventing the slider from being entirely withdrawn from the apparatus 10.

Nest 22 with clamp 14 holds the pad onto table 24 with the pad's slot 26 exposed and aligned with its centerline aligned with the center of magnet 18.

All materials of the apparatus 10, except magnet 18, are non magnetic.

When a magnetic core 32 is placed on the table 24 near the magnet, the magnetic field of the circular magnet causes the core to stand on edge as shown in the figures. When the slider is pushed towards the pad 14, it moves the core 32 with it. The core follows the magnet aligned in the direction of motion. Because a circular magnet's flux fields are radial, the core tends to align with the magnetic field along a radial. The moving motion gradually causes the core to move to align along the radial in the direction of motion. As magnet's center is mounted along the centerline of the pad's slot, it eventually moves the core into the slot. No other orientation or placement is required.

Also shown in FIG. 1 are a set screw 50 which may be loosened to adjust the pad nest 22 so that the slot 26 of pad 12 is in perfect alignment along the center of the magnet. As well, a stop screw 60 is provided to terminate the motion of the slider 16 at a position 16', after the core is fully placed in the slot. The magnetic field of the magnet is useful to hold the core in place in the slot during subsequent operations wherein the core is bonded to the pad. The set and stop screws are not shown in subsequent figures.

FIG. 3 is a front plan view of the apparatus 10. In this figure magnet 18 is visible, mounted on slider 16 just below table top 24. Also shown in the figure (in phantom line) is a runner 20 for guiding the motion of the slider 16. The other elements shown in the figure have previously been discussed. They are clamp 14, pad 12 having a slot 26 aligned on the center of the magnet 18 by pad nest 22, and upper 28 and lower 30 members of apparatus 10.

Figure 4:
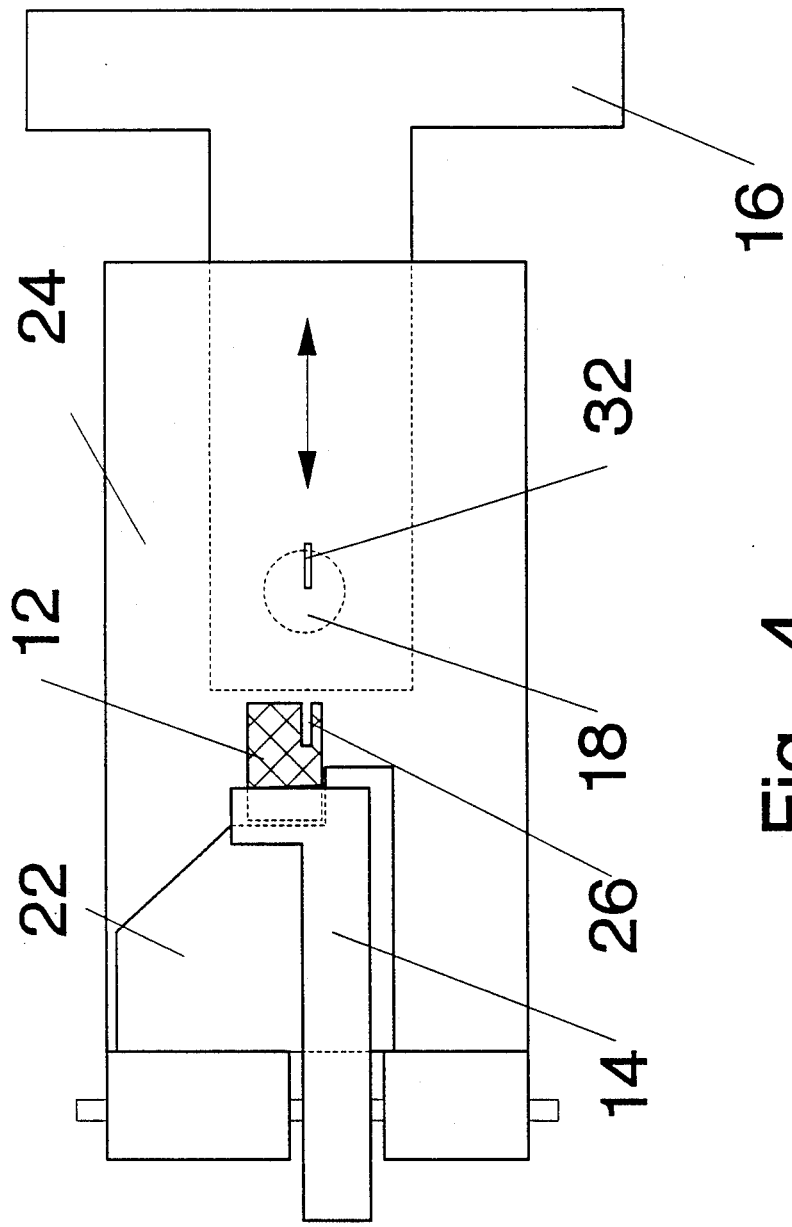
FIG. 4 is a top plan view of the apparatus.

FIG. 4 is a top plan view of the apparatus showing in phantom line the other portions of slider 16 not heretofore visible and circular magnet 18. When moving the core 32 towards slot 26, the core, as above discussed, follows the center of the circular magnet 18 along a radial line of flux.

Figure 5:
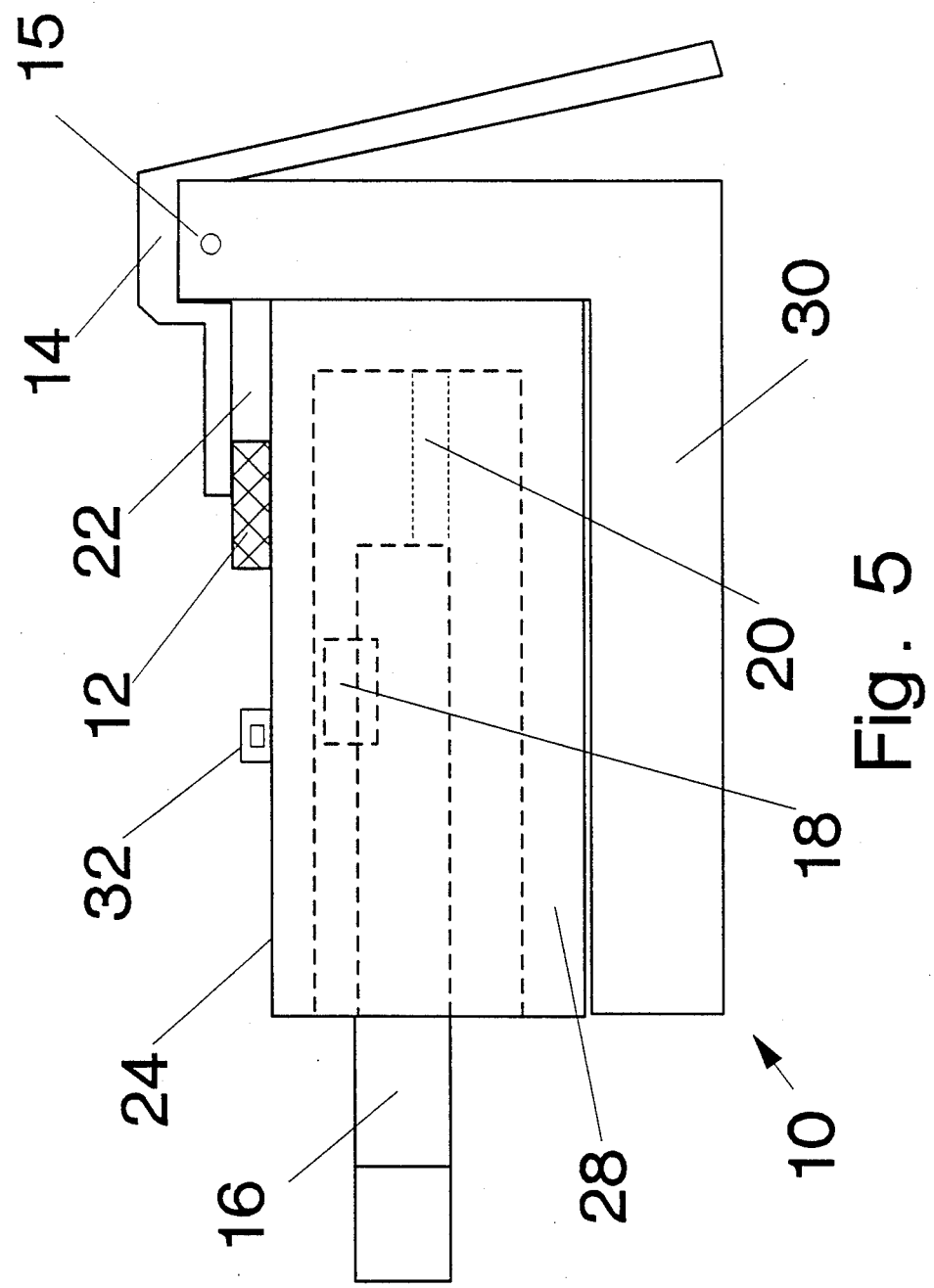
FIG. 5 is a side plan view of the apparatus.

FIG. 5 is a side plan view of apparatus 10. This view shows the other elements previously discussed and as well the runner 20 upon which slider 16 runs and is guided. As well, the figure shows the handle of clamp 14, which pivots on rod 15. the clamp shown in the figure is a simple lever. The invention contemplates more elaborate clamps, including cams, etc. It is important to note in this figure that core 32 trails the center of circular magnet 18.

While the description of the embodiment of this invention pertains to particular materials and structures, the invention is not restricted to these particular materials and structures. It is understood that other arrangements may be devised with the scope of the invention.

We claim:

1. A method of placing a magnetic workpiece in a slot of a second non magnetic workpiece comprising the steps of mounting below a non magnetic table a circular magnet with its center slidable along a predetermined line;

clamping a second workpiece having a slot on the table; with said slot exposed and its centerline aligned with said line and the center of the magnet;

placing said first magnetic workpiece on the table adjacent the magnet; and sliding the magnet towards the slot along said predetermined line thereby moving and aligning the first magnetic workpiece along the slot centerline until it enters the slot.

2. A method of placing a ferrite core in a slot of a pad of a ferrite head comprising the steps of mounting below a non magnetic table a circular magnet with its center slidable along a predetermined line;

clamping a head pad having a slot on the table; with said slot exposed and its centerline aligned with said line and the center of the magnet;

placing a ferrite core in the table adjacent the magnet; and sliding the magnet towards the slot along said predetermined line thereby moving and aligning the ferrite core along the slot centerline until it enters the slot.

* * * * *